United States Patent [19]

Ito et al.

[11] 4,278,336
[45] Jul. 14, 1981

[54] OPERATION DETECTING DEVICE FOR CAMERA

[75] Inventors: Fumio Ito; Isao Harigaya, both of Yokohama; Tetsuya Taguchi, Kawasaki; Shuichi Tamura, Yokohama; Michio Hirohata, Kawasaki; Mutsuhide Matsuda, Yokohama, all of Japan

[73] Assignee: Canon Kabushiki Kaisha, Tokyo, Japan

[21] Appl. No.: 5,702

[22] Filed: Jan. 23, 1979

[30] Foreign Application Priority Data

Jan. 31, 1978 [JP] Japan ................................. 53/9669

[51] Int. Cl.$^3$ .................... G03B 7/081; G03B 9/08; G03B 17/20; H01H 47/00
[52] U.S. Cl. ........................................ 354/51; 354/53; 354/234; 354/289; 354/173; 361/159
[58] Field of Search ............... 354/50, 51, 53, 60 R, 354/60 F, 60 L, 171, 173, 204–206, 234, 235, 289; 361/159

[56] References Cited

U.S. PATENT DOCUMENTS

| | | |
|---|---|---|
| 3,241,471 | 3/1966 | Burgarella .................... 354/235 |
| 3,275,899 | 9/1966 | De Wolf ........................ 361/159 |
| 3,882,362 | 5/1975 | Watanabe ..................... 354/50 X |
| 3,946,409 | 3/1976 | Toyoda .......................... 354/173 |
| 4,037,236 | 7/1977 | Numata et al. ................ 354/51 |
| 4,084,169 | 4/1978 | Iwata et al. ................... 354/173 |
| 4,112,443 | 9/1978 | Iouchi ......................... 354/60 L X |

Primary Examiner—L. T. Hix
Assistant Examiner—William B. Perkey
Attorney, Agent, or Firm—Toren, McGeady and Stanger

[57] ABSTRACT

The present invention is directed to an operation detecting device of a camera for detecting the operation of an operation member such as the shutter member. The operation detecting device functions by detecting the electrical signal produced at the time at which a closed magnetic circuit is opened when a magnet operates so as to actuate or release the operation member.

22 Claims, 5 Drawing Figures

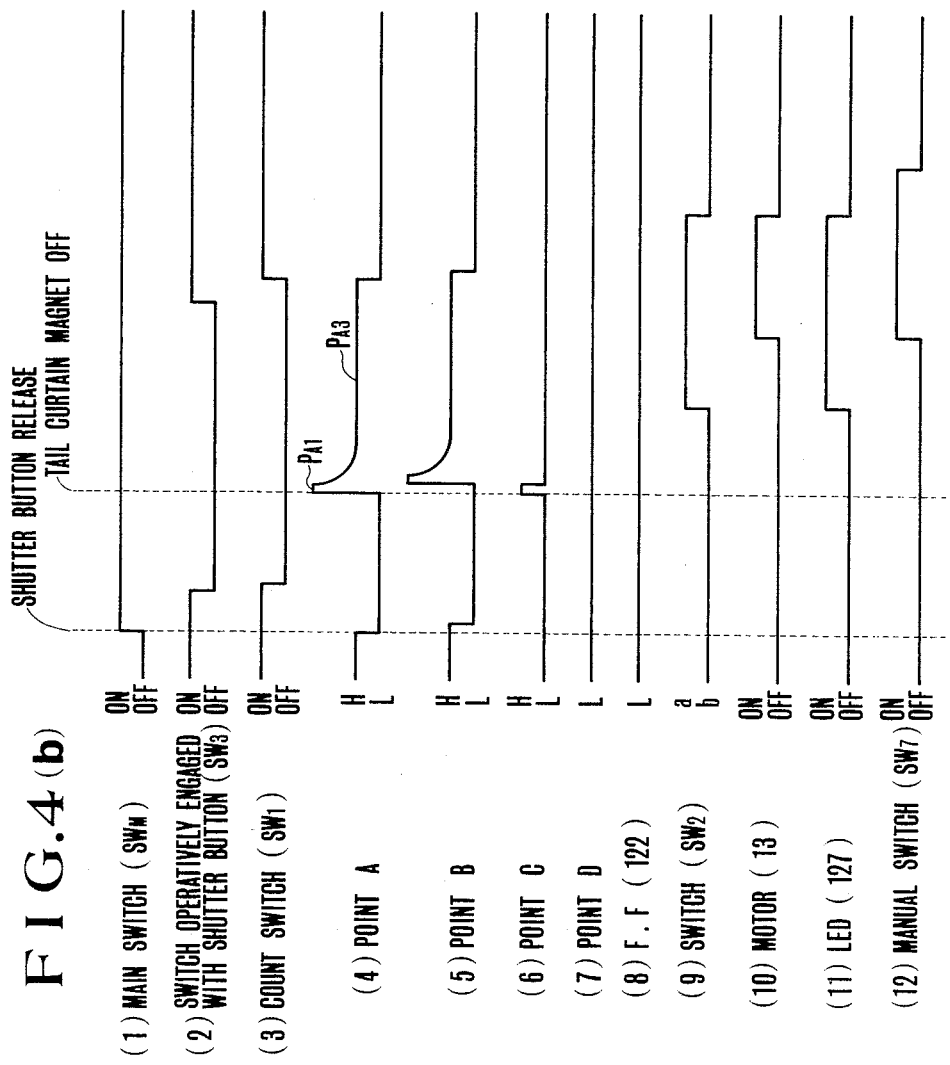

OPERATION DETECTING DEVICE FOR CAMERA

BACKGROUND OF THE INVENTION

1. Field of the Invention

The present invention relates to a camera, particularly a misoperation detecting device for detecting the misoperation of a mechanical member such as the shutter member whose operation is controlled by means of a magnet.

2. Description of the Prior Art

With respect to photographic cameras, it is very important for a photographer, at the time of taking a photograph, to know whether the shutter has operated normally so as to properly expose the film surface. If it is immediately detected that the shutter has not operated normally and the film surface has not been exposed, it would be possible to reset the shutter and take a picture of the same object from the beginning. If, however, the abnormal operation of the shutter is detected too late, it is very often impossible to take a photograph of the same subject. This is particularly so in ordinary camera systems when completely exposed film has been sent to the developing shop and there is a long time between the actual photographing and the completion of prints. Further, even in the case of the self-developing type camera, such as the instant photographic camera now in mode, it is necessary to wait for about three minutes to obtain a visible image after taking a photograph. Thus, if it is detected in three minutes that the shutter has not operated normally, it would be too late to take a photograph of the same object because the object usually changes in the interim. Consequently, it is most advantageous for the photographer to be able to know at the earliest possible moment whether the camera has operated normally or not.

Some of the conventional cameras have been designed so that the photographer can know at the time of taking a photograph whether the shutter has been normally operated so as to expose the film. For example, as is disclosed in the Japanese utility model pubilication No. Sho 52-41636, a light sensing element for sensing the light beam passing through the photographing lens when the shutter is totally opened is provided in the dark box of the camera. A lamp provided in the view finder is lit by means of a detecting device for detecting a current produced in the light sensing element so that the photographer can confirm that the shutter has operated normally. The above mentioned arrangement for the conventional camera, however, not only requires an expensive light sensing element but also a space in the dark box of the camera in which the light sensing element is to be provided.

Further, a method for detecting the operation of the shutter by detecting the counter-electromotive force produced in the shutter holding magnet, which is brought into the nonexcited state, has also been considered. However, by means of this method, the counter-electromotive force, when the magnet is brought into the non-excited state, is detected so that it cannot be determined whether the shutter member has actually operated or not. In particular, even when for some reason the leading as well as the tail shutter curtain start to run at the time of the shutter reiease, the tail shutter curtain holding magnet is brought into the non-excited state so that a counter-electromotive force is produced in such a manner that a misoperation confirming operation cannot be carried out correctly. Further, the above mentioned method, in which a light sensing element is used, is inconvenient not only because a space is needed but also because only the shutter operation can be detected. This is so since the light is used in such a manner that it cannot be used for the detection of members, whose operation is controlled by means of a magnet, other than the shutter.

SUMMARY OF THE INVENTION

An object of the present invention is to provide a detecting device for detecting the operation of the control member of the camera by detecting the electrical signal produced when the closed magnetic circuit, whose one part consists of a control member of the camera which is attracted and is held by means of a magnetic force when the magnet is excited, is opened when the magnet is brought into the non-excited state.

Another object of the present invention is to provide a detecting device for detecting the operation of the shutter operation, comprising a shutter device arranged so that when a current is supplied to the magnet provided in the light measuring time control circuit, the shutter device is attracted by means of the magnetic force produced in the yoke of the magnet to be held so as to constitute a closed magnetic circuit. When the current supply to the magnet is interrupted and the magnetic force of the yoke is decreased, the yoke is released. This opens the closed magnetic circuit of the magnet and a detecting device is provided for detecting the electrical signal produced in the coil of the magnet in order to judge when the operation of the shutter device is normal or not.

A further object of the present invention is to provide a camera system in which the above mentioned shutter operation state detecting device is used.

In accordance with the invention, an operation detecting circuit for the control of a camera, whose operation is controlled by means of an electro-magnetic means, comprises an operation control member for a camera, the member controlling the operation of the camera by moving from a first position to a second position. Also included is a magnet for holding the operation control member at the first position. The magnet is for attracting a part of the operation control member to form a closed magnetic circuit of the magnet and for changing the magnetic force so as to release the holding of the operation control member and enable the displacement of the member into the second position, whereby the closed magnetic circuit is opened so as to produce an electrical signal. Additionally included is an operation detecting device for detecting the electrical signal so as to produce an operation signal.

For a better understanding of the present invention, reference is made to the following description and accompanying drawings, while the scope of the present invention will be pointed out in the appended claims.

BRIEF DESCRIPTION OF THE DRAWINGS

In the drawings:

FIGS. 4(a) and 4(b) show timing charts of the photographic camera shown in FIGS. 1 to 3, wherein FIG.

4(a) shows the chart when the shutter operation is normal, while FIG. 4(b) shows the chart when the shutter operation is abnormal.

DESCRIPTION OF THE PREFERRED EMBODIMENTS

Figure 1:
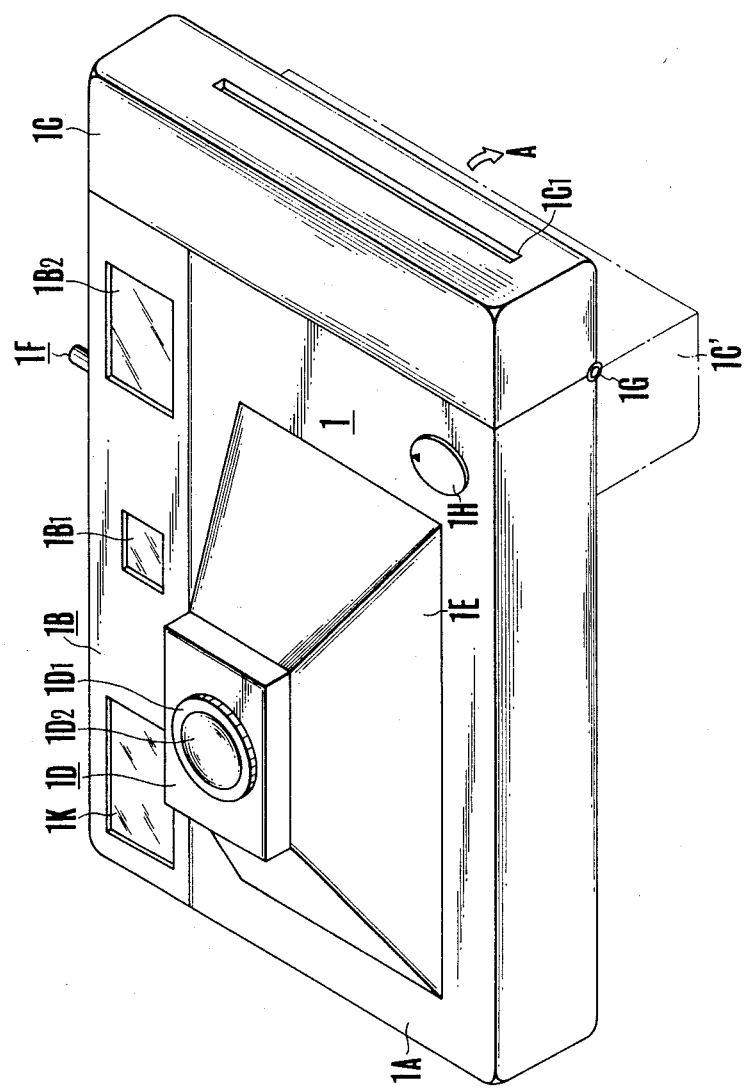
FIG. 1 shows the photographic camera in accordance with the present invention is perspective view.

FIG. 1 shows the photographic camera in accordance with the present invention in perspective view, including a camera body 1, a camera base body 1A, a view finder body, 1B, a film cartridge loading frame body, 1C, a photographic optical system frame body, 1D, a dark box frame body, 1E, a trigger button 1F and an operation button 1H for controlling a, photosensitive sheet material feeding drive circuit. A flash device 1K is built into the camera body.

The finder frame body 1B is secured on the camera base body 1A, being provided with a window for the range and the view finder. The film cartridge loading frame body 1C is engaged with the camera base body by means of a hinge 1G, in such a manner that when the body 1C is urged in the direction of the arrow A around the hinge 1G at the time of loading as well as unloading the film cartridge, the body 1C is rotated in the direction of the arrow A around the hinge 1G into the position shown with 1C' in FIG. 1. Accordingly, the opening of the cartridge chamber in the camera base body is exposed so that the loading as well as the unloading of the film cartridge into as well as out of the cartridge chamber in the camera body 1 is possible. Further, the film cartridge loading frame body 1C is provided with an opening $1C_1$ through which the photosensitive sheet material is carried out of the camera by means of the photosensitive material conveyor (to be explained later). Also shown is a lens barrel $1D_1$ for holding the photographing lens $1D_2$ as well as the distance ring for focusing the lens $1D_2$, which is kept in the photographing optical system frame body 1D. In the photographing optical system frame body 1D, a conventional exposure adjusting mechanism (not shown in the drawing), the distance adjusting mechanism (not shown in the drawing), and so on, are provided aside from the shutter mechanism shown in FIG. 2.

Figure 2:
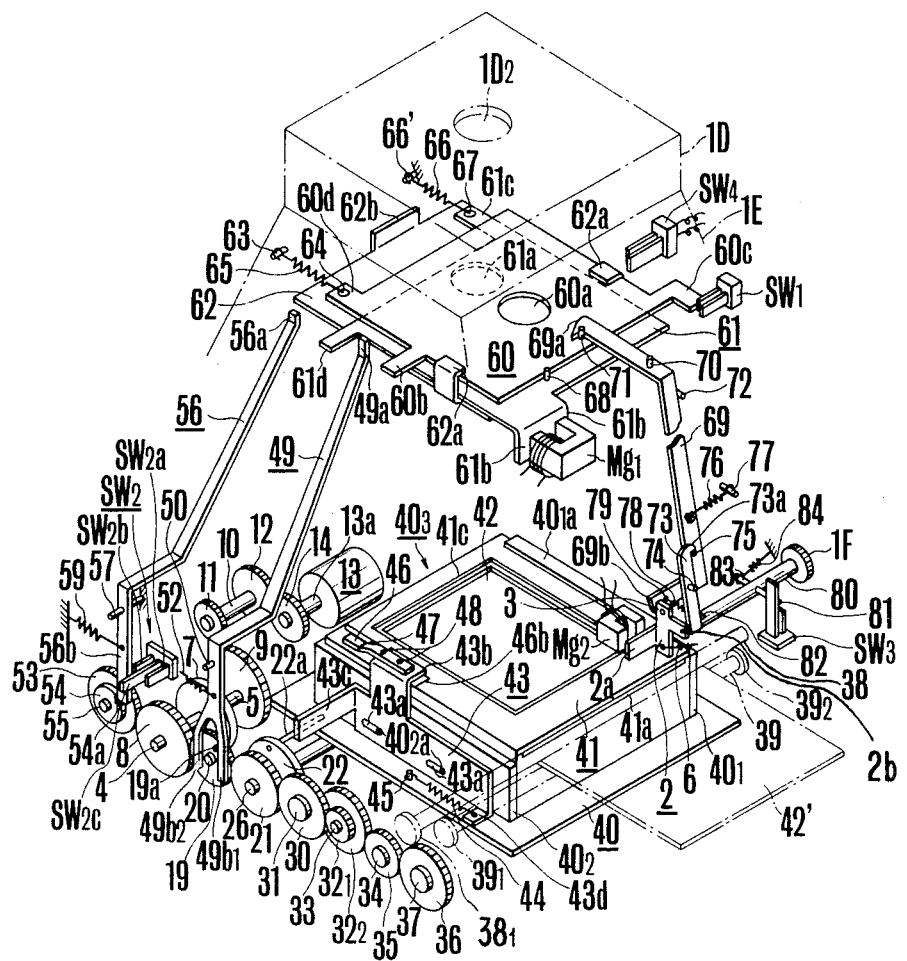
FIG. 2 shows the important members arranged inside of the camera shown in FIG. 1 in perspective view.

FIG. 2 shows the important members inside of the camera shown in FIG. 1 in perspective view. In FIG. 2, rotation axes 4 and 5 are rotatably borne in the camera base body 1A, which axes are arranged concentrically with each other. A plane gear 8 is secured on the rotation axis 4; and a one-way clutch device 7 is provided for controlling the power transmission between the rotation axes 4 and 5. The one-way clutch device 7 is designed so as to transmit rotation to the rotation shaft 4 when the shaft 5 is rotated in the clockwise direction. The clutch device 7 itself is of conventional construction. A plane gear 9 is secured at the other end of the shaft 5. A shaft 10 is rotatably borne in the camera base body 1A, wherein at both ends of the rotation shaft 10, the plane gears 11 and 12 are secured in such a manner that the gear 11 is normally engaged with the gear 9. A motor 13 is secured on the camera body 1A, and a plane gear 14 is secured on the motor shaft 13a being normally engaged with the gear 12. A plane gear 19 is secured on the rotation shaft 20 rotatably borne in the camera body 1A. The plane gear 19 has a pin 19a and is normally engaged with the gear 8. A plane gear 21 is normally engaged with the gear 19, being secured on the rotation shaft 26 rotatably borne on the camera base body 1A. A disc 22 is secured on the same shaft 26 on which the gear 21 is secured, and includes a pin 22a.

A plane gear 30 is secured on the rotation shaft 31 rotatably borne in the camera base body 1A, being normally engaged with the gear 21. Plane gears $32_1$ and $32_2$ are secured on the rotation shaft 33 rotatably borne in the camera base body 1A, whereby the gears $32_1$ and $32_2$ formed one body with each other while the gear $32_1$ is normally engaged with the gear 30. A plane gear 35 is secured on the rotation shaft 34 rotatably borne in the camera base body 1A, being normally engaged with the gear $32_2$. A plane gear 36 is secured on the rotation shaft 37 rotatably borne in the film cartridge loading frame body 1C. The gear 36 is engaged with the gear 35 when the film cartridge loading frame body 1C assumes a state shown in a solid line in FIG. 1 with reference to the camera base body 1A, while the gear 36 is disengaged from the gear 35, being displaced with the film cartridge loading frame body 1C, when the film cartridge loading frame body 1C assumes a state shown in a dotted line.

A pair of the photosensitive material conveyor rollers 38 and 39 are a rotatably borne in the film cartridge loading frame body 1C, which are arranged at a position at which it is convenient to carry the photosensitive sheet material which has passed between the rollers 38 and 39 out of the photosensitive conveyor opening $1C_1$. Further, at one end of the roller 38, a gear $38_1$ is secured so as to be normally engaged with the gear 36. At both ends of the roller 39, a desirable space for allowing the passage of the photosensitive sheet material through the rollers 38 and 39 is provided and space rollers $39_1$ and $39_2$ for obtaining the rotation of the roller 38 are secured. The rollers $39_1$ and $39_2$ are composed of a material with a high friction coefficient such as rubber and are for receiving the rotation of the roller 38. Further, the space provided between rollers 38 and 39 serves to break the developing solution bag in the photosensitive material under the pressure of the rollers in order to spread the solution over the photosensitive material. This occurs when the self-developing type, photosensitive sheet material containing a self-developing solution bag is passed through the rollers 38 and 39.

A base plate 40 of the film cartridge chamber is secured in the camera base body 1A. The base plate 40 consists of three side wall plate parts $40_1$, $40_2$ and $40_3$ having one opening for loading the film cartridge 41. The side wall plate part $40_1$ includes a bent part $40_{1a}$ for controlling the upward displacement of the film cartridge 41 loaded in the film cartridge chamber. The cartridge 41 loaded in the film cartridge chamber is positioned by means of the side wall plate parts $40_1$, $40_2$ and $40_3$. In this cartridge, a plural number of self-developing type, photosensitive material sheets 42, which have a self-developing type solution bag as is disclosed, for example, in U.S. Pat. No. 3,682,076, are laid one over the other. The film cartridge 41 is provided with an opening 41a for taking out the exposed photosensitive material sheets 42, a notch for allowing the entrance of the member for driving the exposed sheets of photosensitive material out of the opening 41a and the opening 41c for exposing the photosensitive material sheets 42. Further, on the bottom of the film cartridge 41, an urging means for urging a plural number of the photosensitive material sheets 42 laid one over the other in the film cartridge 41 toward the opening 41c, such as, for example, a plate spring, is provided. This is done in such a manner that after the uppermost, exposed, photosensitive material sheet 42 has been taken out of the opening 41a, the next photosensitive material sheet 42 is upwardly displaced by means of the urging means so as to be automatically moved into a desirable exposure position. The opening 41a is dimensioned so as to allow the passage of only one photosensitive material sheet 42.

A base plate 43 is provided for the pre-conveyor device for taking the photosensitive material sheets 42 loaded in the film cartridge 41 one by one out of the opening 41a so as to carry the material 42 into a position at which the front end of the photosensitive material sheet 42 is clamped. Base plate 43 is provided with a guide hole 43a extending in the conveying direction of the photosensitive material 42, a bent part 43b for controlling the upward displacement of the film cartridge 41, a part 43c to be engaged with a long pin 22a provided on the disc 22 and a bent part 43d with which one end of the spring 44 is engaged. Base plate 43 is provided in such a manner that a pin $40_{2a}$ provided on the side wall part $40_2$ of the base plate 40 is engaged in the guide hole 43a, which is slidable in the conveying direction of the photosensitive material sheets 42. The slide motion is controlled by means of the guide hole 43a and the pin $40_{2a}$. Spring 44 is engaged with the bent part 43d of the base plate 43 with the one end and with the pin 45 provided on the base plate with the other end so as to normally urge the base plate 43 in the direction opposite to the conveying direction.

A photosensitive material conveying plate spring 46 is secured on the bent part 43b of the base plate 43 by means of a set screw so as to be positioned in the notch 41b of the film cartridge 41 in the cartridge chamber. On the surface of the plate spring 46 facing the photosensitive material sheets 42, a friction part with high friction coefficient 47 is provided. The friction member 47 is in contact with the photosensitive material 42 in the cartridge 41 by means of plate spring 46 under pressure. This is done to bring the uppermost photosensitive material sheet 42 in the cartridge toward the opening 41a until the front end of the photosensitive material sheet 42 is clamped between the rollers 38 and 39 when the base plate 43 is slided in the conveying direction. In this manner, the slide motion of the base plate 43 is caused by the rotation of the disc 22. That is, when the long pin 22a is rotated along with the rotation of the disc 22, the engaging part 43c of the base plate 43 assumes the position at which the pin 22a is engaged with the part 43c. This is done so that the base plate 43 is urged in the conveying direction along with the rotation of the long pin 22a engaged in the part 43c until the long pin 22a is disengaged from the part 43c.

A rotary shutter charge lever 49 is secured on the shaft 50 rotatably borne in the camera base body 1A. One end 49a of the lever 49 extends into a position at which the end 49a can be engaged with a part of the leading shutter curtain while the other end 49b is fork-shaped. The lever 49 is rotated in the counterclockwise direction around the shaft 50 when the pin 19a is in contact with the arm $49b_1$ at the other end of the lever 49, while the lever 49 is rotated in the clockwise direction when the pin 19a is in contact with the arm $49b_2$. Further, the lever 49 is normally urged in the clockwise direction by means of a spring 52 arranged between the lever 49 and the camera base body 1A. A plane gear 53 is secured on the rotation shaft 55 rotatably borne on the camera body 1A, being normally engaged with the gear 8. A disc-shaped cam member 54 is secured on the same rotation shaft 55 as that arranged for the gear 53, whereby a concave portion 54a is shaped at a part of the circumference of the cam member 54. A rotary conveyor motor control lever 56 is secured on the shaft 57 rotatably borne in the camera body 1A. The lever 56 is normally urged in the clockwise direction along with the spring 59 which is arranged between the lever 56 and the camera base 1A. One end 56a of the lever 56 extends into a position at which the end 56a can be engaged with a part of the tail shutter curtain (to be explained later), while the other end 56b is normally in contact with the circumference cam of the cam member 54.

A change-over switch $SW_2$ is secured on the camera base body 1A, and is arranged so as to be in contact with the contact $SW_{2a}$ by means of the urging force of the lever 56 when the lever 56 is rotated in the counterclockwise direction and in contact with the contact $SW_{2b}$ when the lever 56 is rotated in the clockwise direction, being plunged into the concave portion 54a in the cam member 54. A leading shutter curtain 60 is included in the shutter device arranged in the photographing optics frame body 1D, along with a tail shutter curtain 61. A shutter holding plate 62 guides the displacement of the leading shutter curtain 60 and the tail shutter curtain 61, having bent portions 62a and 62b for controlling these displacements. The leading shutter curtain 60 includes exposure opening 60a, an engaging portion to be engageable with the one end 49a of the shutter charge lever 49, a switch control part 60c and a spring engaging part 60d, which is normally urged toward the left in FIG. 2 by means of a spring arranged between the pin 63 provided in the photographing optical system frame body and the pin 64 provided on the engaging part 60d of the leading shutter curtain 60. Further, the tail shutter curtain 61, which is arranged to overlap over the leading shutter curtain, includes an exposure opening 61a, a bent portion 61b, a spring engaging portion 61c and an engaging portion 61d engageable with the one end 56a of the conveyor motor control lever 56, and is normally urged toward the left in FIG. 2 by means of a spring 66 arranged between a pin 66' provided on the photographing optical system frame body 1D and a pin 67 provided on the engaging portion 61c.

A pin 68 is provided on the tail shutter curtain 61, which allows the tail shutter curtain 61 to assume the original position together with the leading shutter curtain 60 when the leading shutter curtain 60 is returned toward the right in FIG. 2 by means of the shutter charge lever 49. A rotary holding lever 69 is rotatably borne in the photographic optical system frame body 1D. On the one end of the holding lever 69, a holding claw part 69a is provided so as to be engaged with the stopper pin 71 and to forceably hold the leading shutter curtain 60 and the tail shutter curtain 61 in the state in which the springs 65 and 66 are charged, while the other end 69b extends into the camera base body 1A. A stopper pin 72 is provided in the photographing optical system frame body 1D, serving to control the rotation amount of the holding lever 69 in the counterclockwise direction. The holding lever 69 is normally urged in the counterclockwise direction by means of a spring 76 arranged between the pin 77 provided in the photographing optical system frame body 1D and a pin provided on the holding lever 69. A lever 73 is rotatably carried on the holding lever 69 by means of a pin 74 on the holding lever 69. The one end of the lever 73 is provided with the engaging claw 73a engaged with the pin 75 provided on the holding lever 69 while the other end is engaged with the one end of the spring 78, whose other end is engaged with the pin 79 provided on the one end 69b of the holding lever in such a manner that the lever 73 is normally urged in the clockwise direction.

A trigger member 80 is slidably borne in the camera body 1, whereby at the one end of the trigger member 80, the trigger button 1F projecting out of the camera body 1 is secured. The trigger member 80 includes a pin 81 for controlling the trigger switch $SW_3$, a pin 82 for controlling the levers 69 and 73 and a spring engaging pin 83. The pin 83 of the trigger member 80 is engaged with the one end of the spring 84, whose other end is engaged with the camera base body 1A. This is done so that, by means of the spring 84, the trigger member 80 is normally urged so as to drive the trigger button 1F out of the camera body 1. Further, the pin 81 of the trigger member 80 is arranged to open the switch $SW_3$ when the trigger button 1F is pushed into the camera body 1. Pin 82 is arranged at the position at which, when the trigger button 1F is pushed into the camera body 1, the pin 82 comes into contact with the lever 73 so as to rotate the lever 73 in the clockwise direction.

A "judge" lever 2 is rotatably borne by means of a pin 3 provided in the camera base body 1A. The judge lever 2 includes a bent part 2a and the engaging part 2b, being normally urged in the counter-clockwise direction by means of a spring 6 arranged between the judge lever 2 and the camera base body 1A. A magnet $Mg_2$ is secured on the camera base body 1A so as to face toward the bent part 2a of the judge lever 2. This judge lever 2 and the magnet $Mg_2$ function as follows. When the magnet $Mg_2$ is in the non-excited state, the judge lever 2 assumes the position at which the lever 2 has been rotated in the counterclockwise direction by means of the urging strength of the spring 6, whereby the engaging part 2b is arranged within the slidable range of the trigger member 80. In this state, even if the trigger button 1F is actuated, the trigger member 80, which is in contact with the engaging part 2b of the judge lever 2, cannot be pushed down anymore so that the trigger operation cannot take place. Once the magnet $Mg_2$ is excited, the engaging part 2b of the judge lever 2 is attracted by means of the magnet $Mg_2$ in such a manner that the judge lever 2 is rotated in the clockwise direction against the urging strength of the spring 6, when the engaging part 2b of the judge lever 2 is removed out of the slidable range of the trigger member 80. This is done in such a manner that the trigger member 80 can be displaced into the operable position when the trigger button 1F is pushed down. $Mg_1$ is the magnet for holding the tail shutter curtain 61 for a certain determined time interval at a position (shown in FIG. 2) at which the spring 66 is charged even after the pin 71 on the leading shutter curtain 61 has been disengaged from the engaging claw 69a of the holding lever 69. This allows the start of the leading shutter curtain 60, the trigger button 1F having been actuated, whereby the magnet $Mg_1$ is secured on the photographing optical system frame body 1D.

The leading shutter curtain 60 and the tail shutter curtain 61 are arranged so that, after the lapse of a certain determined time interval after the release of the leading shutter curtain 60, the tail shutter curtain 61 starts to run. In the state in which only the leading shutter curtain 60 has run until it enters into contact with the control bent part 62b of the holding plate 62, the opening 60a of the leading shutter curtain 60 overlaps on the opening 61a of the tail shutter curtain 61, so as to expose the surface of the photosensitive sheet material 42. When the tail shutter curtain 61 has run until it enters into contact with the control bent part 62b of the holding plate 62, the opening 60a of the leading shutter curtain 60 does not overlap on the opening 61a of the tail shutter curtain 61. Accordingly, the light beam incident on the surface of the photosensitive sheet material 42 is shaded.

A normally opened type switch $SW_1$ is secured in the photographing optical system frame body 1D at the position at which the switch $SW_1$ is controlled by means of the switch control part 60c of the leading shutter curtain 60. This is done in such a manner that the switch $SW_1$ is opened by means of the pressing strength of the switch control part 60c of the shutter leading curtain 60 when the leading shutter curtain 60 is charged as is shown in FIG. 2. Switch $SW_1$ is opened when the leading shutter curtain 60 has run. A normally open type switch $SW_4$ is secured in the photographing optical system frame body at a position at which the switch $SW_4$ is controlled by means of the switch control part 60c of the leading shutter curtain 60 in such a manner that the switch $SW_4$ is closed by means of the switch control part 60c of the leading shutter curtain 60 when the leading shutter curtain 60 has completely run, while the switch $SW_4$ is opened again when the leading shutter curtain 60 has been charged.

Figure 3:
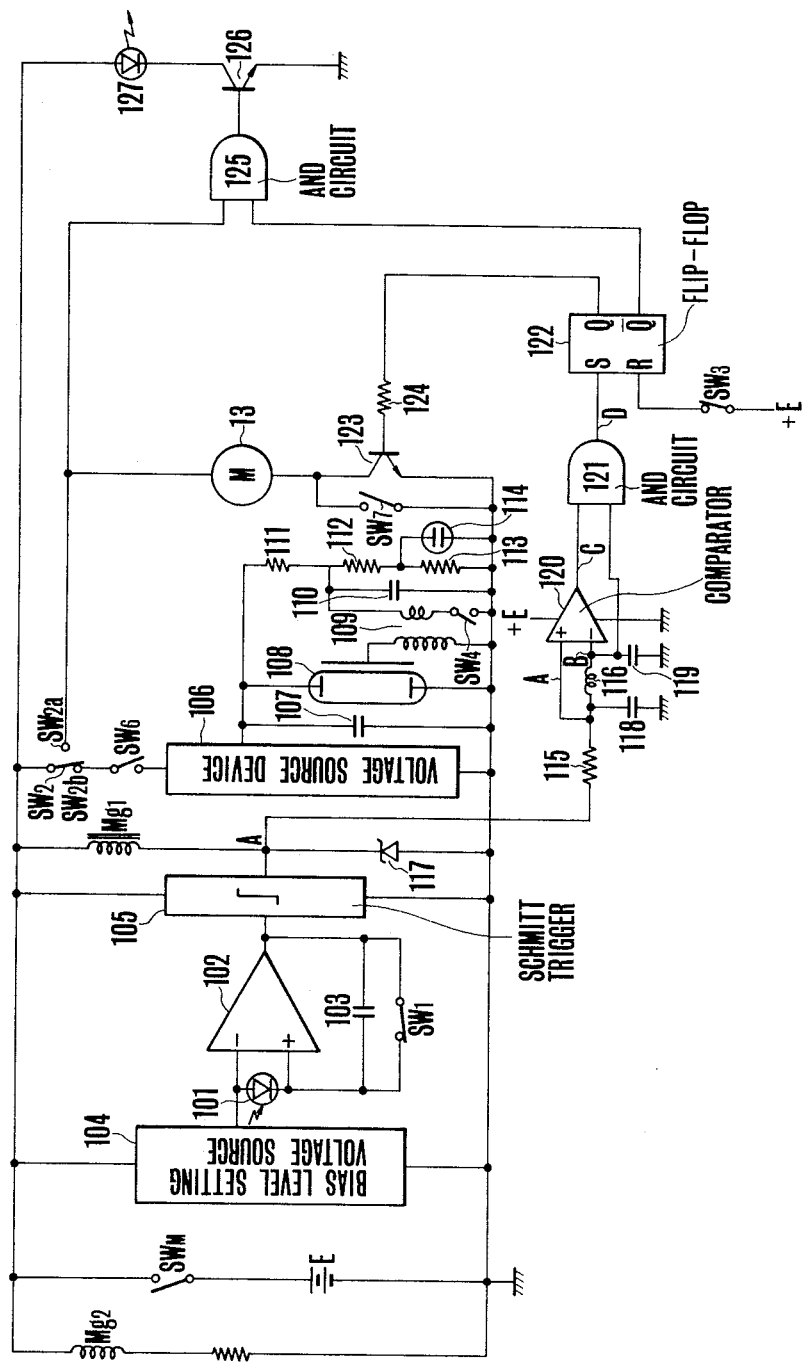
FIG. 3 shows the control circuit for controlling the camera shown in FIGS. 1 and 2.

FIG. 3 shows an embodiment of the control circuit for controlling the instant camera shown in FIGS. 1 and 2.

FIG. 3 includes a power source E, a main switch $SW_M$, a photo-electromotive transducing element 101 such as a silicon photo-diode, a high input impedance operational amplifier 102, and a time integrating condenser 103 connected between the input and the output of the amplifier 102. The condenser and the amplifier constitute a Miller integrating circuit. Also shown is a bias level setting voltage source 104 and a switch $SW_1$ for starting the time counting as is shown in FIG. 2. Switch $SW_1$ thus serves to start charging the condenser 103.

A Schmitt trigger circuit 105 is provided for controlling the current supply to the magnet $Mg_1$ shown in FIG. 2. This is done so that the current is supplied to the magnet $Mg_1$ until switch $SW_1$ is opened along with the start of the leading shutter curtain 60. The photo-current produced by the photoelectric transducing element 101 in accordance with the brightness of the object to be photographed is charged in the condenser so that the output voltage of the operational amplifier 102 becomes higher than the trigger level of the Schmitt trigger circuit 105. The current supply to the magnet is prevented, when the output voltage of the operational amplifier 102, which has reached the trigger level of the Schmitt trigger circuit 105, is inverted.

That is, the photoelectric transducing element 101, the operational amplifier 102, the condenser 103, the bias level setting voltage source 104, the Schmitt trigger circuit 105, the switch $SW_1$ and the magnet $Mg_1$ constitute the light measuring, time-control circuit. This light measuring, time-control circuit device serves to determine the time between the start of the leading shutter curtain 60 and that of the tail shutter curtain 61, namely, the time during which the opening 60a of the leading shutter curtain 60 overlaps over the opening 61a of the tail shutter curtain 61 so as to expose the photosensitive material sheets 42, which construction is conventional for the electric shutter device. A zener diode 113 serves to prevent the counter-electromotive force induced in the tail curtain control magnet $Mg_1$ from undesirably influencing the other circuits.

FIG. 3 also shows a voltage source device 106 for the flash light device, a main condenser 107, a flash light discharge tube 108, a trigger coil 109, a trigger condenser 110, bleeder resistances 111, 112 and 113, and a neon tube 114. These members constitute the flash light emitting circuit for the flash device 1K. A switch $SW_6$ is arranged to be closed at the time of the flash photography and otherwise opened. The opening and the closing of the switch is controlled by the photographer from the outside of the camera switch. $SW_2$ is connected to the contact $SW_{2a}$ or $SW_{2b}$ by means of the switch lever 56 shown in FIG. 2.

FIG. 3 further shows a resistance 115, a coil 116 and condensers 118 and 119, these elements constituting a delay circuit, a comparator 120, to the non-inverting terminal of which a signal is applied from the output terminal of the Schmitt trigger circuit 105, and to the inverting terminal of which is applied the signal to be applied to the non-inverting terminal after passing through the delay circuit. Also shown is an AND circuit 121, a flip-flop circuit 122 and a transistor 123, the base circuit of which is connected to the Q output terminal of the flip-flop circuit 122 and the collector circuit of which is connected to the motor 13. The reset terminal R of the flip-flop circuit 122 is connected to the switch $SW_3$ which circuit is reset by means of the switch $SW_3$. A switch $SW_7$ is operable from outside and connected to the motor in series with the motor 13. An AND circuit 125 has one input terminal connected to the Q output terminal of the flip-flop circuit 123, and its other input terminal is connected to the contact $SW_{2a}$. A transistor 126 has its base circuit connected to the output terminal of the AND circuit 125. An LED 127 is connected to the collector circuit of the transistor 126, which LED is arranged, for example, in a view finder of a camera at a position at which it can be recognizable.

Figure 4A:
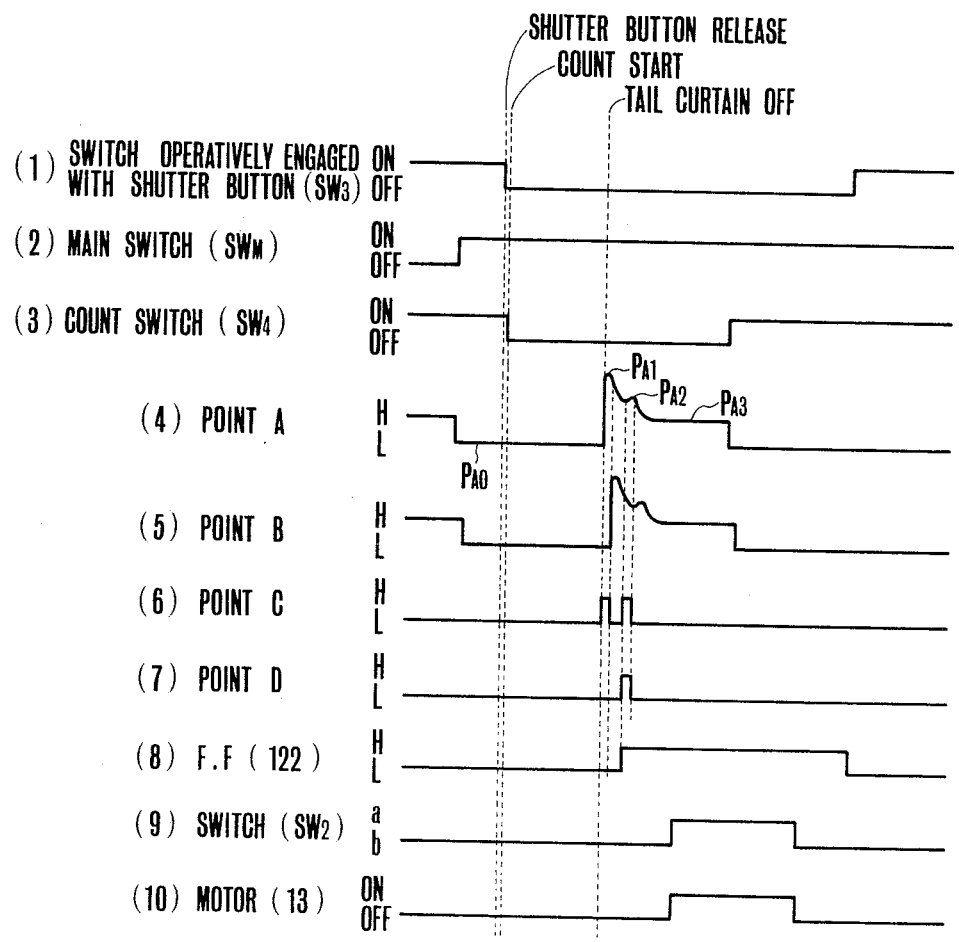

FIG. 4 shows timing charts of the photographic camera shown in FIGS. 1 to 3. FIG. 4(a) shows the chart when the shutter operation is normal, while FIG. 4(b) shows the chart when the shutter operation is abnormal.

Below, the waveform at the point A in the timing chart in FIG. 4, which is the output part of the Schmitt trigger circuit, will be explained. When the trigger button 1F has not yet been operated in the state in which the main switch $SW_M$ is closed, so that the switch $SW_1$ is in the closed state, the level at the point A, namely, the output part of the Schmitt trigger circuit 105, is low so that the magnet Mg is in the conductive state. When the trigger button 1F is operated so as to start the leading shutter curtain 60, the switch $SW_1$ enters into the opened state so that the level at the input part of the Schmitt trigger circuit 105 starts to rise until it reaches a certain determined value. At this level, the Schmitt trigger circuit is inverted so that the level at the point A becomes high so as to interrupt the current supply to the magnet $Mg_1$. At the moment at which the current supply to the magnet $Mg_1$ is interrupted, a counter-electromotive force $PA_1$ is induced in the magnet $Mg_1$. This is done in such a manner that the voltage at the point A would reach several tens of volts, however, in the present embodiment, the induced counter-electromotive force $PA_1$ is limited by the action of the Zenor diode 117. The voltage at point A then goes down to the determined high level $PA_2$.

When, along with the inversion of the Schmitt trigger circuit 105 the magnet $Mg_1$ is switched off, the tail shutter curtain 61 starts to run and the bent part 61b of the tail shutter curtain 61 is brought away from the magnet $Mg_1$. Accordingly, the magnet circuit consisting of the yoke of the magnet $Mg_1$ and the bent part 61b of the tail shutter curtain 61 is opened, when the counter-electromotive force $PA_2$ takes place again (FIG. 4(a)). However, when the shutter has not been charged completely, that is, when the shutter has been charged in the condition where the bent part 61b of the tail shutter curtain 61 is not in contact with the yoke of the magnet $Mg_1$, or when the shutter has been charged in the condition in which the bent part 61b of the tail shutter curtain 61 is in an incomplete contact with the yoke of the magnet $Mg_1$ so that the magnetic circuit consisting of the bent part 61b of the tail shutter curtain 61 and the yoke of the magnet Mg is opened from the very beginning (even if the current supply to the magnet $Mg_1$ were interrupted along with the inversion of the Schmitt trigger circuit 105), the counter-electromotive force shown by $PA_2$ in FIG. 4(a) is not induced (FIG. 4(b)). In other words, it is possible to judge from the existence of this counter-electromotive force $PA_2$ whether the operation of the shutter is normal or not.

Below, the operation of the camera in accordance with the present invention will be explained.

The switch $SW_6$ is opened by operating the setting member (not shown in the drawing) from outside when the photographer decides to carry out daylight photography as determined from the scene, and the brightness of the object. Switch $SW_6$ is closed when the photographer decides to carry out flash photography.

Below, the case of daylight photography will be explained when switch $SW_6$ is opened.

FIGS. 2 and 3 show the state in which the shutter has been charged. In this state, the contact $SW_{2c}$ of the switch $SW_2$ is short-circuited by means of the contact $SW_{2b}$ under the control of the lever 56. Further, the switch $SW_2$ is in the closed state. When, in this state, the main switch $SW_M$ is closed, the light measuring time control circuit is connected to the power source E. The flip-flop circuit 122 is reset so that the transistors 123 and 126 are brought in the switched-off state, while a current is supplied to the magnet $Mg_2$ to attract the lever 2 in order to allow triggering by means of the trigger member 80. The LED 127 is in the extinguished state. In this state, the switch $SW_1$ is in the closed state. Accordingly, the condenser 103 is not charged and the level at the point A, which is the output part of the Schmitt trigger circuit 105, is low to allow the current supply to the magnet $Mg_1$. When the trigger button 1F is actuated into the opened state, the switch $SW_3$ is brought into the opened state by means of the pin 81 on the trigger member 80. Further, the lever 73 is pushed by means of the pin 82 on the trigger member 80. The strength with which the pin 82 on the trigger member 80 pushes the lever 73 is transmitted to the lever 69 through the pins 74 and 75 so as to rotate the lever 69 around the pin 70 and disengage the pin 71 on the leading shutter curtain 60 from the holding claw 69a. When the pin 71 on the leading shutter curtain 60 is disengaged from the holding claw 69a, the leading shutter curtain 60 is displaced by means of the strength charged in the spring 65 until the curtain 60 enters into contact with the control bent part 62b so as to close the switch $SW_4$ and start the exposure.

Even if now, the switch $SW_4$ were closed by means of the leading shutter curtain 60, the flash device is in the non-operative state so that the closing of the switch $SW_4$ will have no effect on the camera. Further, in this state, the input level of the Schmitt trigger circuit 105 has not yet reached a certain determined value, so that the Schmitt trigger circuit is not inverted and current continues to be supplied to the magnet $Mg_1$, while the tail shutter curtain 61 is held by means of the magnet $Mg_1$. When the switch $SW_1$ is opened along with the start of the leading shutter curtain 60, that is, the start of the exposure, the condenser 103 starts to be charged with the photo-current produced in the photo-electric transducing element 101 in accordance with the brightness of the object to be photographed so as to start the counting of the light measuring time control device. When, along with the charging of the condenser 103, the output voltage of the operation circuit 102 reaches the trigger level of the Schmitt trigger circuit 105 after the lapse of a time corresponding to the brightness of the object to be photographed, the Schmitt trigger circuit 105 is inverted so as to interrupt the current supply to the magnet $Mg_1$. At this time, a counter-electromotive force $PA_1$ is induced in the magnet $Mg_1$ so that the level at the point A, which would reach several tens of volts, is cut off by means of the Zener diode of 19V in the present embodiment, and then goes down to a certain determined high level $PA_3$. Then when the current supply to the magnet $Mg_1$ is interrupted, the tail shutter curtain 61, attracted until then by means of the magnet $Mg_1$, is released. Thus, the bent part 61b is brought away from the yoke of the magnet $Mg_1$ so that, in the same way as mentioned above, a counter-electromotive force $PA_2$ is induced in the magnet $Mg_1$ again, while the tail shutter curtain 61 is displaced by means of the urging strength of the spring 66 until it enters into contact with the control bent part 62b of the holding plate 62 so as to terminate the exposure.

Further, because the potential at the point A is directly applied to the non-inverting input terminal of the comparator 120 through the resistance 115 and at the same time to the inverting input terminal of the comparator 120 through the delay circuit consisting of a coil 116 and condensers 118 and 119, when the tail shutter curtain operates normally so as to close the shutter opening, a waveform as is shown with (4) in FIG. 4(a) is applied to the non-inverting input terminal of the comparator 120 while a waveform as is shown with (5) in FIG. 4(a) is applied to the inverting input terminal. Thus, the comparator 120 detects the voltage $PA_2$ so as to produce a pulse as is shown with (6) in FIG. 4(a), which pulse is transmitted to one input terminal of the AND gate 121. Further, a waveform as is shown with (5) in FIG. 4(a) and applied to the inverting input terminal of the comparator 120 is applied to the other input terminal of the AND gate 121 so that the gate 121 produces a pulse as is shown with (7) in FIG. 4(a) in synchronization with the pulse. Thus, the flip-flop circuit 122 is set, whereby a high level signal is delivered from the Q output terminal so as to bring the transistor 123 into the switched-on state. At the same time, the tail shutter curtain 61 starts to run.

Immediately before the tail shutter curtain 61 has struck against the control bent part 62b, the engaging part 61d of the tail shutter curtain 61 strikes against the lever 56 so as to rotate the lever 56 in the counterclockwise direction around the pin 57. Thus, the one end 56b of the lever 56 is disengaged from the concave part 54a in the cam member 54 so as to bring the gear 53 in a freely rotatable state, while the contact $SW_{2c}$ of the switch $SW_2$, which has been short-circuited with the contact $SW_{2b}$, is short-circited with the contact $SW_{2a}$. Thus, a current supply circuit for the motor 13 is constituted with the switch $SW_2$ and the transistor 123 to start the motor 13. When the motor 13 starts to run in this way after termination of the exposure, the rotation of the motor 13 is transmitted to the rotation shaft 5 through the gears 14, 12, 11 and 9 and further to the rotation shaft 4 through the one-way clutch 7 so as to rotate the gear 8. Along with the rotation of the gear 8, the gear 53 is rotated in such a manner that the cam member 54 integral with the gear 53 is rotated at the same time, while the gear 19 engaged with the gear 8 is rotated. The rotation of the gear 19 is also transmitted to the gear 381 through the gears 21, 30, $32_1$, $32_2$, 35 and 36. Along with the rotation of the gear 38, the rollers 38 and 39 rotate, while along the rotation of the gear 21, the disc 22 is rotated. Thus, the rotating disc 22 pushes the engaging part 43c of the base plate 43 against the long pin 22a on the disc 22 so as to displace the base plate 43 towards the right in FIG. 2. Along with the displacement of this base plate 43, the uppermost just-exposed, photosensitive material sheet 42 in the cartridge 41 engaged with the friction member 47 of the plate spring 46 is brought out of the take-off opening 41a by means of the plate spring 46 secured on the base plate until the front end of the material 42 is clamped between the rollers 38 and 39.

When the first end of the photosensitive material sheet 42 has been clamped between the rollers 38 and 39, the material 42 is brought out of the opening $1C_1$ by means of the rotating rollers 38 and 39, whereby the developing solution bag contained in the material sheet 42 is broken between the rollers 38 and 39 so as to spread the developing solution coming out of the bag over the photosensitive surface in order to carry out the self-development.

When the gear 19 is rotated along with the rotation of the gear 8, the shutter charge lever 49 is rotated in the clockwise direction around the pin 50 by means of the pin 19a on the gear 19 so as to wind up the leading and the tail shutter curtains 60 and 61. That is, when the shutter charge lever 49 is rotated in the clockwise direction by means of the pin 19a on the gear 19, one end 49a of the lever is engaged with the engaging part 60b of the leading shutter curtain 60 so as to displace the leading shutter curtain 60 to the right in FIG. 2 against the urging strength of the spring 65. Because the leading shutter curtain 60 is engaged with the pin 68 on the tail shutter curtain 61, when the leading shutter 60 is displaced to the right, the leading and the tail shutter curtains 60 and 61 are displaced to the right in FIG. 2 against the urging strength of the springs 65 and 66 until the pin 71 on the leading shutter curtain 60 is engaged with the engaging claw 69a of the holding lever to complete the shutter charge.

On the other hand, when the gear 53 rotates along with the rotation of the gear 8, while the cam member 54 making one body with the gear 53 starts to rotate, the other end 56b of the lever 56 enters into contact with the part with large diameter of the cam member 54. The lever 56 is rotated in the counterclockwise direction until the concave part 54a of the cam member 54 is in contact with the other end 56b of the lever 56 again so that the contact $SW_{2c}$ of the switch $SW_2$ is kept in the short-circuited state with the contact $SW_{2a}$.

Then when the concave part 54a of the cam member 54 is in contact with the other end 56b of the lever 56, the lever 56 is rotated in the clockwise direction around the pin 57 of the lever 56 by means of the urging strength of the spring 59 in such a manner that the contact $SW_{2c}$ of the switch $SW_2$ is changed over from the contact $SW_{2a}$ to the contact $SW_{2b}$. Consequently, the motor 13 stops. That is, the time from the start of the cam member 54 until the arrival of the concave part 54a of the cam member 54 at the position corresponding to the other end 56b of the lever 56, namely, the time during which the contact $SW_{2c}$ of the switch, which has been short-circuited to the contact $SW_{2a}$, is changed over to the contact $SW_{2b}$, is determined so as to correspond to that time during which the shutter is completely charged and the photosensitive material sheet 42 is completely carried out. When the trigger button 1F, which has been actuated, is released after it has been confirmed that the exposure and the self-development of the photosensitive material sheet 42 has been completed and carried out, the switch $SW_2$ is closed again and the flip-flop circuit is reset in such a manner that the state before the photographing is established.

Thus far, the case, when the operation of the shutter is normal, has been explained. Below, the case, when the operation of the shutter is abnormal, will be explained.

When the shutter has been charged in the case of this kind of camera, the contact of the magnet $Mg_1$ with the bent part 61b of the tail shutter curtain 61 is incomplete so that the holding of the tail shutter curtain 61 by means of the magnet $Mg_1$ is not stable. Therefore, it often takes place that the tail shutter curtain 61 starts to run along with the release of the leading shutter curtain 60. In the case of the camera in accordance with the present invention, it is possible to display and confirm such an abnormal operation of the shutter as mentioned above. When the tail shutter curtain 61 is not in contact with the magnet $Mg_1$ in the state the shutter has been charged, the bent part 61b of the tail shutter curtain 61 and the yoke of the magnet $Mg_1$ do not make a closed circuit from the very beginning. Consequently, when the Schmitt trigger circuit 105 is inverted so as to interrupt the current supply to the magnet $Mg_1$, a counter-electromotive force $PA_1$ with a waveform as is shown with (4) in FIG. 4(b) is included in the magnet Mg, but not the counter-electromotive force $PA_2$ as is shown in FIG. 4(a). That is, any counter-electromotive force $PA_2$ is not detected by means of the delay circuit consisting of the capacitors 118, 119, the comparator 120 and the AND circuit 121, so that the flip-flop circuit 122 is never set and therefore the transistor 123 is not closed or turned on. Further, in the above-mentioned state, the tail shutter curtain is not held by means of the magnet $Mg_1$ so that the tail shutter curtain 61 has already run, together with the leading shutter curtain 60, when the leading shutter curtain 60 has run. Therefore, although the contact $SW_{2c}$ of the switch $SW_2$ has been changed over from the contact $SW_{2b}$ to the contact $SW_{2a}$, the transistor 123 is in the opened or turned on state so that the motor 13 does not rotate and the film winding up is not carried out. Further, in the case of the abnormal operation of the shutter as mentioned above, the flip-flop 122 is not set. Accordingly, after the shutter release, a high level signal is produced from the AND circuit 125 and the transistor 126 is brought in the closed state so as to cause the LED 127 to be lit. The LED 127, which is lit, is displayed in the view finder, from which the photographer can judge whether the operation of the shutter is normal or not.

Thus, when the manual operation switch $SW_7$ is closed when the LED 127 is lit, current flows through the switch $SW_2$, the motor 13 and the switch $SW_7$ so as to rotate the motor 13. In the same way as in the case of normal operation, the shutter is charged while the photosensitive material sheet 42 is fed. Along with the completion of the film winding up, the switch $SW_1$ is closed again, while the contact $SW_{2c}$ of the switch $SW_2$ is short-circuited to the contact $SW_{2b}$ so that the motor 13 stops, while the transistor 126 is brought into the opened state so as to extinguish the LED 127.

Below, the case of the flash photography will be explained, whereby the switch $SW_6$ is in the closed state. Flash photography is possible in the state in which the switch $SW_6$ is in the closed state in FIG. 3. When the main switch $SW_M$ is closed in the above-mentioned state, current flows through the flash device 1K and the light measuring time control circuit. In this state, the switch $SW_1$ is in the closed state and the condenser 103 is not charged so that the level $PA_0$ at the point A, which is the output part of the Schmitt trigger circuit 105, is low so as to allow the current supply to the magnet $Mg_1$.

On the other hand, as to the flash device 1K, because the switch $SW_6$ is in the closed state, the main condenser 107 and the trigger condenser 110 start to be charged until they have been charged up to a certain determined amount and the neon tube is lighted by means of the bleeder resistances 111, 112 and 113. The flash device is ready for operation when the neon tube 114 is lit up. When the trigger button 1F is actuated after it has been confirmed that the neon tube 114 is lit, the leading shutter curtain 60 starts to run in the same way as in the above-mentioned case. The switch $SW_4$ is closed when the switch control part 60c of the leading shutter curtain 60 is actuated after the leading shutter curtain 60 has run. Along with the closing of the switch $SW_4$, the trigger condenser 110 is discharged in such a manner that the discharge tube 108 is actuated by means of the trigger coil 109 so as to carry out the flash photography. When the switch $SW_1$ is closed after the leading shutter curtain 60 has started to run, the shutter time starts to be counted in the light measuring control circuit, whereby the photoelectric transducing element 101 is exposed to a sufficient light emitted by means of the flash device 1K, so that the input part of the Schmitt trigger circuit 105 reaches a certain determined level and is inverted earlier than when the element 101 is not exposed, so as to interrupt the current supply to the magnet $Mg_1$. The operation, after the current supply to the magnet $Mg_1$, is carried out in the same way as in the above-mentioned case. That is, the shutter is charged again while the contact $SW_{2c}$ of the switch $SW_2$ is changed over from the contact $SW_{2a}$ to the contact $SW_{2b}$ so as to start charging the flash device 1K. Also, in the case of flash photography by means of the flash device 1K, the operation state of the shutter is detected in the same way as in the case of the daylight photography.

As explained above, the photographic camera in accordance with the present invention, includes a shutter device arranged so that when a current is supplied to the magnet provided in the light measuring time control circuit, the shutter device is attracted by means of the magnetic force produced in the yoke of the magnet to be held so as to constitute a closed magnetic circuit.

When the current supply to the magnet is interrupted and the magnetic force of the yoke is decreased, the yoke is released so as to open the closed magnetic circuit of the magnet and a detecting device operates to detect the electrical signal produced in the coil of the magnet in order to judge when the operation of the shutter device is normal or not. Accordingly, a light sensing element for detecting the operation state of the shutter, which has been provided in the conventional photographic camera, is no longer needed. Further, the production cost of the camera can be decreased while the space normally provided for the light sensing element is not required, which contributes substantially to the realization of a compact camera.

While the foregoing description and drawings represent the preferred embodiments of the present invention, it will be obvious to those skilled in the art that various changes and modifications may be made therein without departing from the true spirit and scope of the present invention.

What is claimed is:

1. An operation detecting circuit for a control member of a camera, the control member being electromagnetically actuated, comprising:
   (a) an operation control member within the camera for controlling the operation of the camera, said member being movable between a first position and a second position;
   (b) a switching circuit for providing an output current;
   (c) a magnet coupled to said switching circuit for holding said operation control member at said first position when said output current is provided by said switching circuit, said magnet being arranged to attract a part of the operation control member to form a closed magnetic circuit when the operation control member is at said first position, said magnet releasing said operation control member for movement to said second position when said output current provided by said switching circuit is cut off,
   said magnet being operative to produce an output signal including a first electrical signal when said output current is cut off and a second electrical signal when said closed magnetic circuit is opened by movement of said part of said operation control member to said second position; and
   (d) an operation detecting device for detecting the operation of said operation control member, said detecting device including a delay circuit coupled to said magnet for delaying said output signal from said magnet for a certain time and a comparison circuit for comparing the output of said delay circuit with said output signal from said magnet to provide a signal representing the operation of said operation control member.

2. An operation detecting device for a camera shutter, comprising:
   (a) a shutter member arranged for movement between a first position and a second position for carrying out a shutter operation;
   (b) a magnet for holding said shutter member at said first position, said magnet including a yoke for holding said shutter member at said first position by magnetic force produced in said yoke when a current is supplied to said magnet, said magnet releasing said shutter member for movement to said second position when the current supplied to said magnet is interrupted;
   (c) means for forming a closed magnetic circuit which includes said magnet when said shutter member is held at said first position by said magnet wherein said magnet produces an output signal including a certain electrical signal when said closed magnetic circuit is opened; and
   (d) a detecting circuit for detecting the operation of said shutter member, said detecting circuit including a delay circuit coupled to said magnet for delaying said output signal from said magnet for a certain time and a comparison circuit for comparing the output of said delay circuit with said output signal from said magnet to provide a signal representing the operation of said shutter member.

3. An operation detecting device in accordance with claim 2, wherein said means forming said closed magnetic circuit is integrally formed with said shutter member.

4. An operation detecting circuit for a control member of a camera, the control member being electromagnetically actuated, comprising:
   (a) an operation control member within the camera for controlling the operation of the camera, said member being movable between a first position and a second position;
   (b) a magnet for holding said operation control member at said first position and for attracting a part of said operation control member with a magnetic force to form a closed magnetic circuit which includes said magnet, said magnet being operative to vary the magnetic force so as to release said operation control member for movement to said second position, wherein the closed magnetic circuit is opened when said operation control member is displaced toward said second position, and said magnet provides an output voltage when said magnetic force is varied to release said operation control member and when said closed magnetic circuit is opened; and
   (c) an operation detecting device for detecting the operation of said operation control member, said detecting device including a delay circuit coupled to said magnet for delaying said output voltage of said magnet for a certain time and a comparison circuit for comparing the output of said delay circuit with said output voltage of said magnet to provide a signal representing the operation of said operation control member.

5. An operation detecting device in accordance with claim 4, including display means for providing a display in response to the signal provided by said detecting device.

6. An operation detecting circuit for a control member of a camera, the control member being electromagnetically actuated, comprising:
   (a) an operation control member within the camera for controlling the operation of the camera, said member being movable between a first position and a second position;
   (b) a magnet for holding said operation control member at said first position, said magnet including a yoke for holding said member at said first position by magnetic force produced in said yoke when a current is supplied to said magnet, said magnet releasing said member for movement to said second position when the current supplied to said magnet is interrupted, a part of said operation control member forming a closed magnetic circuit including said magnet when at said first position, wherein said closed magnetic circuit is opened when said operation control member is released for movement to said second position, and said magnet provides an output voltage when the current supplied to said magnet is interrupted and when said closed magnetic circuit is opened; and (c) an operation detecting device for detecting the operation of said control member, said detecting device including a delay circuit coupled to said magnet for delaying said output voltage for a certain time and a comparison circuit for comparing the output of the delay circuit with said output voltage of said magnet to provide a signal representing the operation of said operation control member.

7. An operation detecting device in accordance with claim 6, including display means for providing a display in response to the signal provided by said detecting device.

8. An operation detecting device for a camera shutter, comprising:

(a) a shutter member for carrying out a shutter operation by moving from a first position to a second position;

(b) a magnet for holding the shutter member at said first position, said magnet including a yoke for holding said shutter member at said first position by magnetic force produced in said yoke when a current is supplied to said magnet, said magnet releasing said shutter member for movement to said second position when the current supplied to said magnet is interrupted;

(c) means for forming a closed magnetic circuit which includes said magnet when said shutter member is held at said first position by said magnet, said means being arranged to open said closed magnetic circuit when said shutter member is released by said magnet for movement to said second position, said magnet providing an output voltage when the current supplied to said magnet is interrupted and when said closed magnetic circuit is opened; and (d) a detecting circuit for detecting the operation of said shutter member, said detecting circuit including a delay circuit coupled to said magnet for delaying said output voltage for a certain time and a comparison circuit for comparing the output of the delay circuit with said output voltage of said magnet to provide a signal representing the operation of said shutter member.

9. An operation detecting device in accordance with claim 8, wherein said means forming said closed magnetic circuit is integrally formed with said shutter member.

10. An operation detecting device in accordance with claim 8, including display means for providing a display in response to the signal provided by said detecting circuit.

11. An operation detecting device in accordance with claim 10, wherein the camera includes a view finder and said display means is arranged in the view finder.

12. An operation detecting device for a camera shutter, comprising:

(a) an exposure time control circuit for controlling exposure time and providing a termination signal at the end of a certain exposure time;

(b) a magnet for providing a magnetic force which varies in response to said termination signal;

(c) shutter means for performing an exposure operation, said shutter means being arranged to be held by said magnetic force of said magnet at a position at which an exposure is enabled, and to be released by said magnet for movement to a position at which the exposure is terminated when said magnetic force is varied;

(d) a member associated with said shutter means for forming a closed magnetic circuit including said magnet when said shutter means is held at the position at which the exposure is enabled, said member being arranged to open said closed magnetic circuit when said member is released by said magnet for movement to the position at which the exposure is terminated, said magnet providing an output voltage when said magnetic force is varied to release said shutter means and when said closed magnetic circuit is opened; and (e) detecting means for detecting the operation of said shutter means, said detecting means including a delay circuit coupled to said magnet for delaying said output voltage for a certain time and a comparison circuit for comparing the output of said delay circuit with the output voltage of said magnet to provide a shutter signal representing the operation of said shutter means.

13. An operation detecting device in accordance with claim 12, wherein said member forming said closed magnetic circuit forms a part of said shutter means.

14. An operation detecting device in accordance with claim 12, wherein said exposure time control circuit includes a light sensing element for providing an output signal corresponding to the brightness of the object to be photographed, so that the exposure time is controlled in accordance with said output signal from said light sensing element.

15. An operation detecting device in accordance with claim 12, including display means for providing a display in response to said shutter signal provided by said detecting means.

16. An operation detecting device in accordance with claim 15, wherein the camera includes a view finder and said display means is arranged in the view finder.

17. A camera comprising:

(a) an exposure time control circuit for controlling exposure time and providing a termination signal at the end of a certain exposure time;

(b) a magnet for providing a magnetic force which varies in response to said termination signal;

(c) shutter means arranged to be held by said magnetic force of said magnet at a position at which an exposure is enabled, and to be released by said magnet for movement to a position at which the exposure is terminated when said magnetic force is varied;

(d) a member associated with said shutter means for forming a closed magnetic circuit including said magnet when said shutter means is held at the position at which the exposure is enabled, said member being arranged to open said closed magnetic circuit when said member is released by said magnet for movement to the position at which the exposure is terminated, said magnet providing an output voltage when said magnetic force is varied to release said shutter means and when said closed magnetic circuit is opened;

(e) detecting means for detecting the operation of said shutter means, said detecting means including a delay circuit coupled to said magnet for delaying said output voltage for a certain time and a comparison circuit for comparing the output of the delay circuit with said output voltage of said magnet to provide a signal representing the operation of said shutter means;

(f) a motor for charging said shutter means; and (g) a driving circuit for providing a supply of current to said motor in response to the signal provided by said detecting means.

18. A camera in accordance with claim 17, wherein said member forming said closed magnetic circuit forms a part of said shutter means.

19. A camera in accordance with claim 17, including display means for providing a display in response to the signal provided by said detecting means.

20. A camera in accordance with claim 19, wherein the camera includes a view finder and said display means is arranged in the view finder.

21. A camera in accordance with claim 17, including current control means for providing a supply of current to said motor independently of the operation of said driving circuit.

22. An operation detecting circuit for a control member of a camera, the control member being electromagnetically actuated, comprising:

(a) an operation control member within the camera for controlling the operation of the camera, said member being movable between a first position and a second position;

(b) a magnet for holding said operation control member at said first position by magnetic force wherein the magnetic force can be varied to release said operation control member from said magnet for movement to said second position;

(c) means for forming a closed magnetic circuit which includes said magnet when said member is held at said first position by said magnet, said means being arranged to open said closed magnetic circuit when said member is released by said magnet for movement to said second position, said magnet providing an output voltage when said magnetic force is varied to release the operation control member and when said closed magnetic circuit is opened; and (d) an operation detecting circuit for detecting the operation of said member, said detecting circuit including a delay circuit coupled to said magnet for delaying said output voltage of said magnet and a comparison circuit for comparing the output of said delay circuit with said output voltage of said magnet to provide a signal representing the operation of said operation control member.

* * * * *